(No Model.) 3 Sheets—Sheet 1.
J. H. WILLIAMS.
CHAIN WRENCH.
No. 377,795. Patented Feb. 14, 1888.
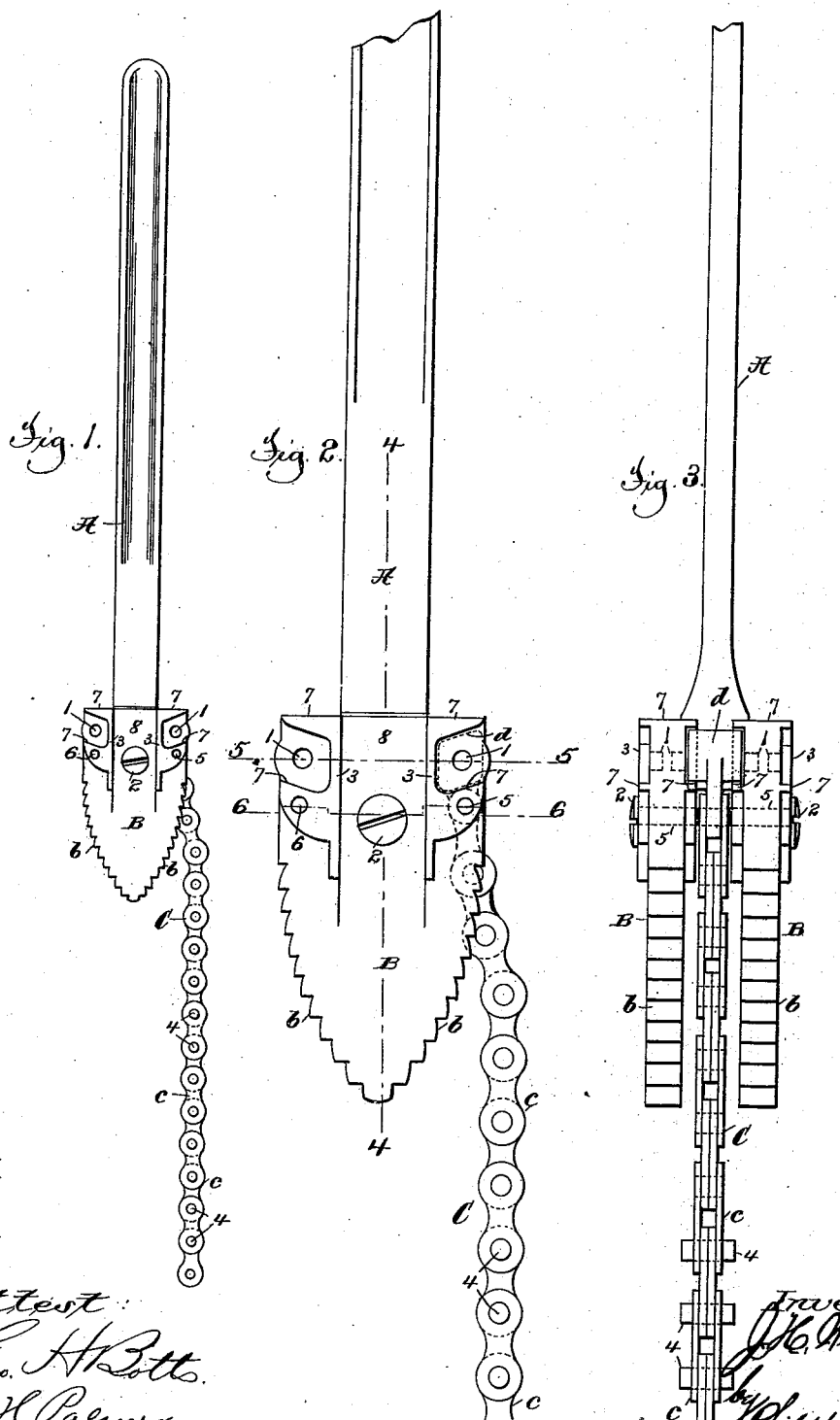

(No Model.) 3 Sheets—Sheet 2.

J. H. WILLIAMS.
CHAIN WRENCH.

No. 377,795. Patented Feb. 14, 1888.

Attest:
Geo. H. Botts.
T. H. Palmer.

Inventor,
J. H. Williams
by Philipp Phelps Hovey
Attys.

(No Model.) 3 Sheets—Sheet 3.
J. H. WILLIAMS.
CHAIN WRENCH.
No. 377,795. Patented Feb. 14, 1888.
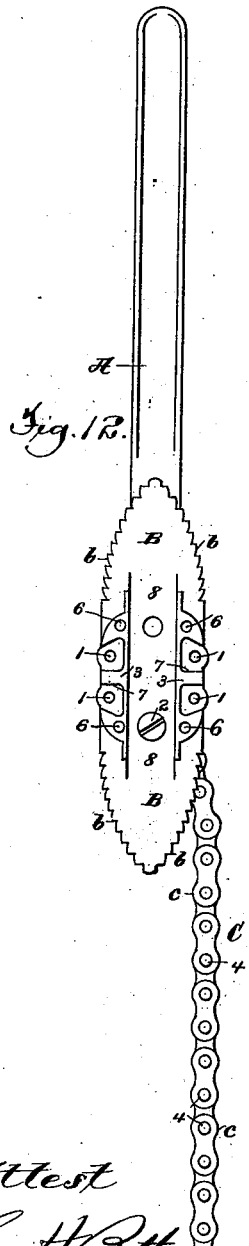
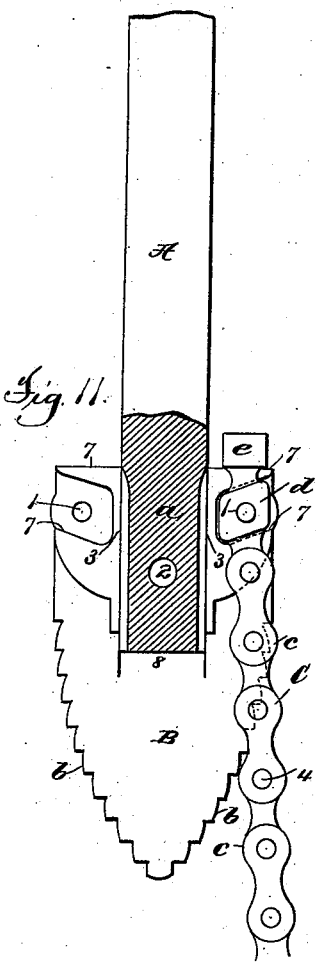
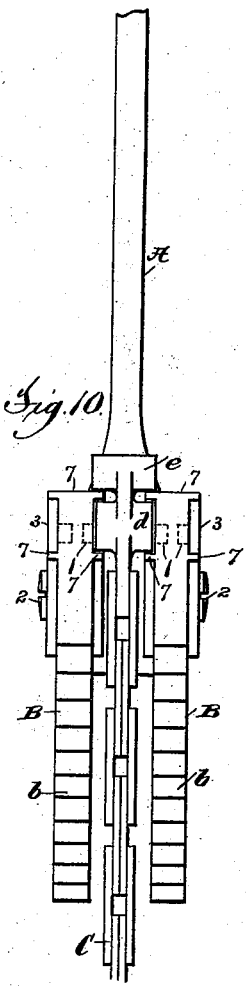
Attest
Geo. H. Potts
T. H. Palmer
Inventor:
J. H. Williams
by Philipp, Philps & Horry
Attys

UNITED STATES PATENT OFFICE.

JAMES H. WILLIAMS, OF BROOKLYN, NEW YORK.

CHAIN-WRENCH.

SPECIFICATION forming part of Letters Patent No. 377,795, dated February 14, 1888.

Application filed May 23, 1887. Serial No. 239,035. (No model.)

*To all whom it may concern:*

Be it known that I, JAMES H. WILLIAMS, a citizen of the United States, residing at Brooklyn, county of Kings, and State of New York, have invented certain new and useful Improvements in Chain-Wrenches, fully described and represented in the following specification and the accompanying drawings, forming a part of the same.

This invention relates to a chain-pipe wrench of the same general construction as that shown and described in United States Letters Patent Nos. 254,862 and 298,242.

The invention consists in certain details in the construction of parts of the wrench, whereby it is rendered stronger and more reliable, and whereby the jaw-plates are made reversible in such manner as to render the wrench less liable to become useless by the breaking of the teeth upon the edges of the jaws.

In order to give a full understanding of the invention, it will be necessary to describe the various improvements in detail, which will now be done, reference being had to the accompanying drawings, in which—

Figure 4:
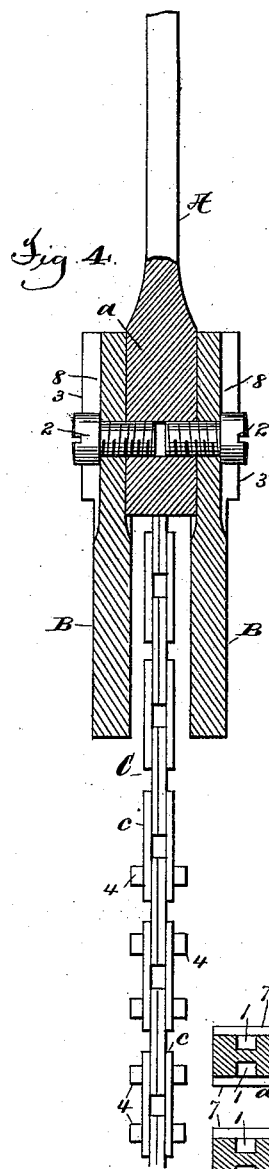
Figure 7:
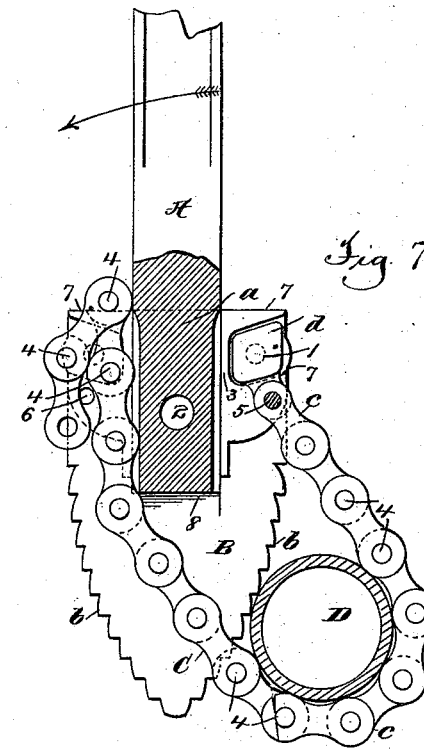
Figure 9:
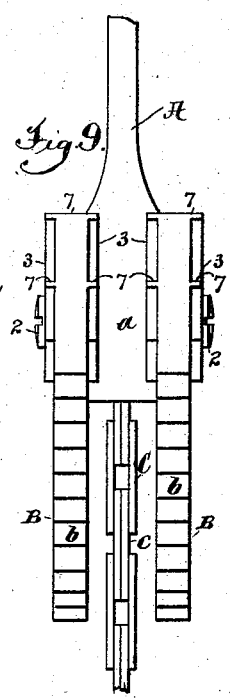
Figure 5:
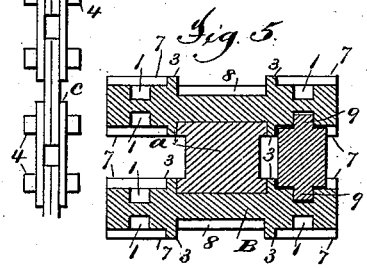
Figure 8:
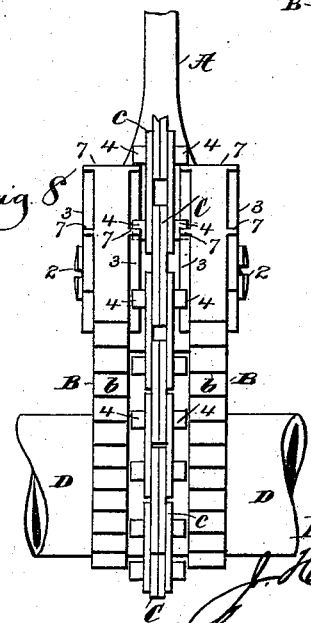
Figure 6:
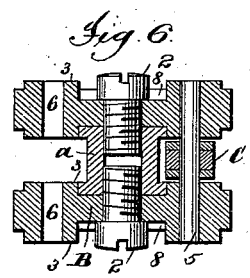

Figure 1 is a side view of a chain-wrench of the same general construction as that shown in the Letters Patent referred to, but also containing the improvements constituting the present invention. Fig. 2 is an enlarged view of a portion of Fig. 1. Fig. 3 is an edge view of the wrench, looking from the right of Figs. 1 and 2. Fig. 4 is a section taken on the line 4 4 of Fig. 2. Figs. 5 and 6 are cross-sections taken, respectively, on the lines 5 5 and 6 6 of Fig. 2. Fig. 7 is a sectional view showing one of the jaw-plates removed and the chain in the position it will occupy when the wrench is in use. Fig. 8 is an edge view looking from the right of Fig. 7, both jaw-plates being shown. Fig. 9 is an edge view looking from the left of Fig. 2. Fig. 10 is a view similar to Fig. 3, illustrating a slight modification, which will be hereinafter referred to. Fig. 11 is a side view of the same, one of the jaw-plates being removed; and Fig. 12 is a view similar to Fig. 1, illustrating another modification.

Referring to said figures, it is to be understood that the wrench therein shown, which is of substantially the same general construction as that shown in the Letters Patent before referred to, consists of a handle, A, provided at its end with two jaw-plates, B, arranged upon the opposite sides of the handle and extending beyond its end, and a chain, C, having one end secured permanently between the jaws at one side of the handle, and arranged to encircle the pipe which is to be operated upon, and have its opposite end secured temporarily between the jaws upon the opposite side of the handle. The jaw-plates B, which are of half-oval form and provided upon their edges with teeth *b*, are secured to a square head, *a*, formed upon the end of the handle by means of screws 2.

The jaws B are provided upon their inner faces with channels 8, the sides of which form shoulders 3, which fit against the sides of the head *a*, so as to secure the jaws rigidly to the handle and remove the strain from the screws 2.

The chain C is composed of links *c*, which are secured together by pins 4, which pass through the links in the usual manner. One end of the chain is secured between the jaws B on one side of the handle in a manner that will presently be explained. The pins 4 at the opposite end of the chain and for a considerable portion of its length extend beyond the links *c*, so as to form projecting studs, as shown in Figs. 3 and 4, and the jaws are provided upon the opposite side of the handle with shoulders 7, which are adapted to engage with the projecting pins 4, so as to secure the free end of the chain between the jaws, as shown in Figs. 8 and 9.

The manner of using the wrench when thus constructed is as follows: The jaws B are placed against the pipe D and the chain C is passed around the pipe and drawn taut and its free end introduced between the jaws, so that the pins 4 of the links will abut against the shoulders 7, as shown in Fig. 8. By then moving the handle A in the direction indicated by the arrow in Fig. 7 the teeth *b* will engage with the pipe, so that the wrench will be effective. The length of the chain C will be sufficient so as to adapt the wrench to operate upon pipes which vary considerably in size.

The jaws B are provided upon both their faces with recesses 8, to receive the head *a* of the handle, and with the shoulders 7, to engage with the pins 4. By reason of this construction it becomes possible, by simply removing the screw 2, to reverse either one of the jaws, so as to cause the teeth $b$ upon either edge of the jaw to coact with the teeth upon either edge of the other jaw, and thus make the wrench available for use as long as the teeth upon one edge of each jaw are in good condition.

In the construction shown in the Letters Patent referred to and in the wrenches heretofore in use the end of the chain which was attached permanently to the jaws was secured in that position simply by a pin, 5, which passed through openings 6 in the jaws and through the links of the chain, so as to take the place of one of the pins 4. This made the connections at the two ends of the chain unequal in strength, the two pins 4 at the free end of the chain, which abutted against the shoulders 7, being much stronger than the one pin 5 at the opposite end, and this where the wrench was subjected to heavy strain was of course a disadvantage. To cure this defect I provide the end of the chain which is to be permanently connected to the jaws with a special link having the head $d$, which fits between the jaws, so as to abut against the shoulders 7, the head $d$ being held in that position between the jaws by means of short pins or studs 9, formed on its sides, which enter recesses 1, formed in the sides of the jaws. This constitutes a very strong connection between the chain and the jaws at that end, and yet permits the chain to be reversed at any time desired by simply removing one of the jaws. This manner of connecting the chain to the jaws constitutes another feature of the invention. This form of connection may be supplemented, if desired, by providing the jaws with the openings 6 and using the pin 5, the same as in the old construction, as shown in Figs. 1 to 7; or, if preferred, the pin 5 may be omitted and the special link at the end of the chain be provided with two heads, $d\ e$, which abut against both of the shoulders 7 of the jaw, as shown in Figs. 10 and 11.

If it should be desired to give still greater durability to the wrench, the plates B may be made double—that is, each provided with four of the toothed edges $b$, as shown in Fig. 12. In this case the jaw-plates can be reversed by turning them end for end as well as side for side. This form will usually not be preferable, however, because of the added weight it gives to the wrench.

What I claim is—

1. In a chain-wrench, the combination, with the handle A, of the jaws B, each having four of the toothed edges $b$ and made separately reversible by turning them end for end and side for side, substantially as described.

2. In a chain-wrench, the combination, with the handle A and the jaws B, having the shoulders 7, of the chain C, having a link at one end provided with the head to engage with the shoulders 7, substantially as described.

3. In a chain-wrench, the combination, with the handle A and the jaws B, having the shoulders 7 and recesses 1, of the chain C, having the head $d$ and projecting pins 9, substantially as described.

4. In a chain-wrench, the combination, with the handle A and the jaws B, having the shoulders 7 and recesses 1, of the chain C, having the special link provided with the heads $d\ e$ and pins 9, to engage with the shoulders 7, substantially as described.

In testimony whereof I have hereunto set my hand in the presence of two subscribing witnesses.

JAMES H. WILLIAMS.

Witnesses:
GEORGE H. BOTTS,
J. J. KENNEDY.